(12) United States Patent
Migaszewski et al.

(10) Patent No.: US 10,920,855 B2
(45) Date of Patent: Feb. 16, 2021

(54) FREEWHEEL MECHANISM

(71) Applicant: EFNEO Sp. z o.o., Warsaw (PL)

(72) Inventors: Wiktor Migaszewski, Warsaw (PL);
Franciszek Migaszewski, Warsaw (PL);
Stefan Migaszewski, Grodzisk Mazowiecki (PL)

(73) Assignee: EFNEO Sp. z o.o., Warsaw (PL)

( * ) Notice: Subject to any disclaimer, the term of this patent is extended or adjusted under 35 U.S.C. 154(b) by 178 days.

(21) Appl. No.: 15/776,589

(22) PCT Filed: Oct. 5, 2016

(86) PCT No.: PCT/PL2016/000112
§ 371 (c)(1),
(2) Date: May 16, 2018

(87) PCT Pub. No.: WO2017/086812
PCT Pub. Date: May 26, 2017

(65) Prior Publication Data
US 2018/0328451 A1    Nov. 15, 2018

(30) Foreign Application Priority Data

Nov. 18, 2015 (PL) .......................... 414846

(51) Int. Cl.
*F16H 1/28* (2006.01)
*F16H 1/00* (2006.01)
(Continued)

(52) U.S. Cl.
CPC ............. *F16H 1/003* (2013.01); *B62M 11/02* (2013.01); *F16D 41/063* (2013.01); *F16D 41/28* (2013.01); *F16H 1/28* (2013.01); *B62M 1/36* (2013.01)

(58) Field of Classification Search
CPC ........... F16H 1/003; F16H 1/28; B62M 11/02; F16D 41/28; F16D 41/063
See application file for complete search history.

(56) References Cited

U.S. PATENT DOCUMENTS 1,610,794 A   12/1926  Keller, Sr.
2,150,715 A    3/1939  De Falco
(Continued)

FOREIGN PATENT DOCUMENTS

FR    356689 A   12/1905
GB    405343 A    2/1934
GB    462044 A    3/1937

OTHER PUBLICATIONS

International Search Report and Written Opinion for PCT/PL2016/000112 dated Apr. 4, 2017.

*Primary Examiner* — Patrick H Mackey
(74) *Attorney, Agent, or Firm* — Michael D. Eisenberg

(57) ABSTRACT

A freewheel mechanism containing an external raceway, rolls, wedges, characterized in that, it contains the external raceway (1) and an external gear (2) that are rigidly connected with each other, and it contains satellite gears (5) and rolls (4) that are rigidly connected with each other, wherein the satellite gears (5) mate with the external gear (2), wherein the satellite gears (5) are mounted on satellite axles (7), wherein the satellite axles (7) are mounted in a yoke (8), wherein the freewheel mechanism contains wedges (9a) of type A, which are placed between the rolls (4) and the external raceway (1).

15 Claims, 4 Drawing Sheets

Figure 1:
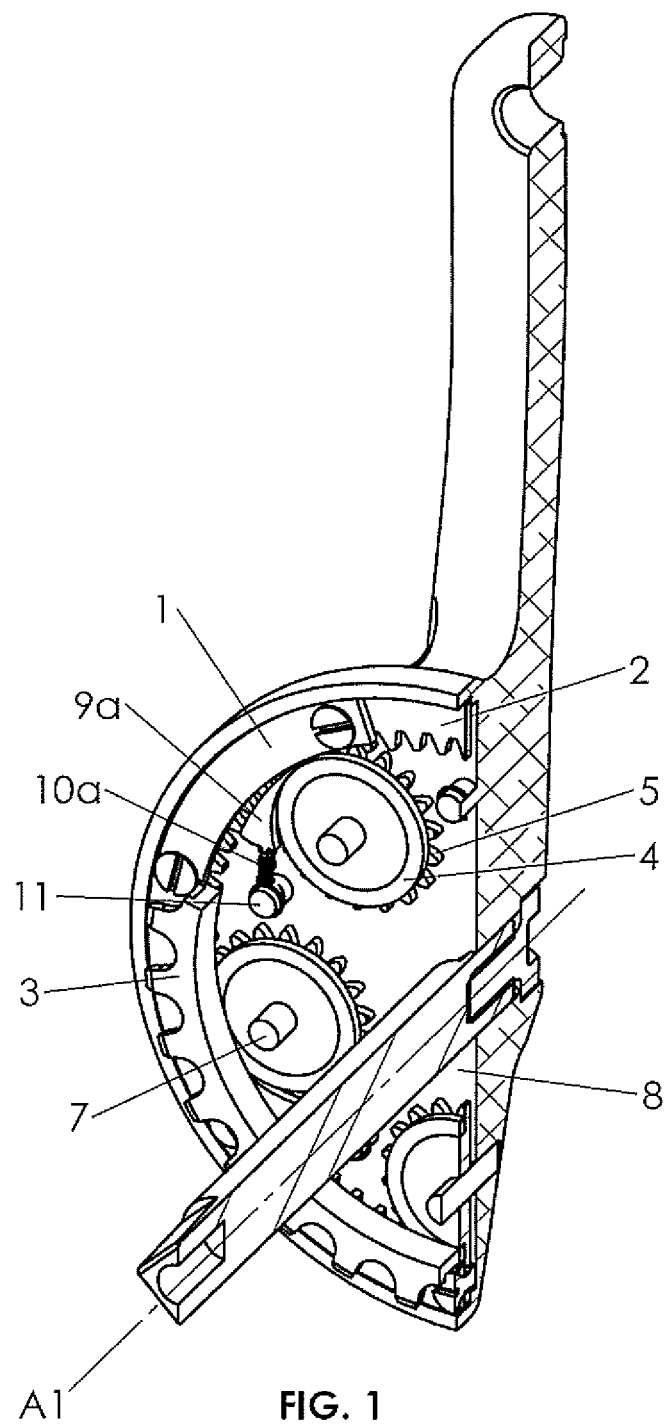

(51) Int. Cl.
*F16D 41/063* (2006.01)
*F16D 41/28* (2006.01)
*B62M 11/02* (2006.01)
*B62M 1/36* (2013.01)

(56) References Cited

U.S. PATENT DOCUMENTS

| | | | |
|---|---|---|---|
| 3,166,169 A | 1/1965 | Wade et al. | |
| 3,442,157 A * | 5/1969 | Novinger | F16H 3/423 475/296 |
| 3,554,339 A * | 1/1971 | Richardson | F16D 41/00 192/20 |
| 3,945,270 A * | 3/1976 | Nelson | F16H 13/04 476/61 |
| 4,117,918 A * | 10/1978 | Silberschlag | F16D 43/18 192/103 B |
| 4,184,388 A * | 1/1980 | Sfredda | F16H 1/32 475/269 |
| 4,302,988 A * | 12/1981 | Takahashi | F16H 13/06 192/20 |
| 4,481,842 A * | 11/1984 | Nelson | F16H 13/06 476/61 |
| 4,800,996 A * | 1/1989 | Loizeau | F16D 13/68 192/103 B |
| 4,932,508 A | 6/1990 | Lederman | |
| 5,024,637 A * | 6/1991 | Guichard | F16H 33/08 475/166 |
| 7,153,230 B2 * | 12/2006 | Ai | F16H 13/06 475/166 |
| 8,152,677 B2 * | 4/2012 | Knepper | F16H 13/06 475/183 |
| 8,597,156 B2 | 12/2013 | Araki et al. | |
| 2012/0125729 A1 * | 5/2012 | Jimbo | F16D 41/00 192/46 |
| 2013/0068581 A1 | 3/2013 | Araki et al. | |

* cited by examiner

FREEWHEEL MECHANISM

The invention relates to a freewheel mechanism, usable for transmission of torque in machines.

The freewheel mechanisms are known from patent descriptions U.S. Pat. Nos. 3,166,169 and 4,932,508, in which a roll is squeezed between two surfaces, thus creating friction allowing transmission of torque. In a freewheel mechanism known from a patent description U.S. Pat. No. 2,150,715 there are wedges used to transmit torque. In a freewheel mechanism known from a patent description US 20130068581 there is a gear is squeezed between two surfaces, used as a mean to transmit torque.

The essence of invention is development of such a freewheel mechanism, where the transmitted torque is larger due to a wedge being pulled in between a raceway and a roll which move with a similar linear speed, due to using gear engagement. As the wedge is being pulled in between two synchronized surfaces of the raceway and the roll, the probability of slipping the raceway over the wedge is minimized. The essence of invention is also development of a freewheel mechanism with a good relation of weight and size to the value of transmitted torque. The essence of invention is also development of a freewheel mechanism, that ensures the coaxiality of the raceway in relation to the set of rolls.

The freewheel mechanism according to the invention is characterized in that it contains an external raceway and an external gear that are rigidly connected with each other, and it contains satellite gears and rolls that are rigidly connected with each other, wherein the satellite gears mate with the external gear, wherein the satellite gears are mounted on satellite axles, wherein the satellite axles are mounted in a yoke, wherein the freewheel mechanism contains wedges of type A, which are placed between the rolls and the external raceway.

Preferably freewheel mechanism contains the roll with a diameter close to the satellite gear pitch circle diameter.

Preferably freewheel mechanism contains the external raceway with a diameter close to the external gear pitch circle diameter.

Preferably freewheel mechanism contains satellite gears that are rotationally mounted on satellite axles.

Preferably freewheel mechanism contains satellite axles that are rotationally mounted in a yoke.

Preferably freewheel mechanism contains wedges of type A, which are pressed by springs of type A into the space between the rolls and the external raceway.

Preferably freewheel mechanism contains springs of type A, which are mounted on bolts.

Preferably freewheel mechanism contains external raceway which is rigidly connected to the chainring.

The invention relates also to a freewheel mechanism which is characterized in that it contains a sun raceway and a sun gear that are rigidly connected with each other, and it contains satellite gears and rolls that are rigidly connected with each other, wherein the satellite gears mate with the sun gear, wherein the satellite gears are mounted on satellite axles, wherein the satellite axles are mounted in a yoke, wherein the freewheel mechanism contains wedges of type B, which are placed between the rolls and the sun raceway.

Preferably freewheel mechanism contains the roll with a diameter close to the satellite gear pitch circle diameter.

Preferably freewheel mechanism contains the sun raceway with a diameter close to the sun gear pitch circle diameter.

Preferably freewheel mechanism contains satellite gears that are rotationally mounted on satellite axles.

Preferably freewheel mechanism contains satellite axles that are rotationally mounted in a yoke.

Preferably freewheel mechanism contains wedges of type B, which are pressed by springs of type B into the space between the rolls and the sun raceway.

Preferably freewheel mechanism contains springs of type 8, which are mounted on bolts.

Figure 2:
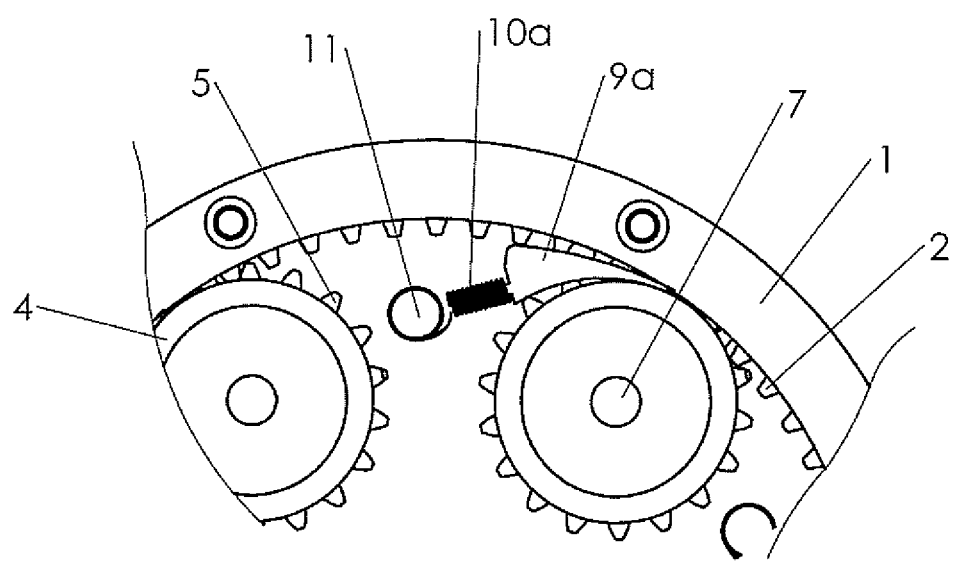
Figure 3:
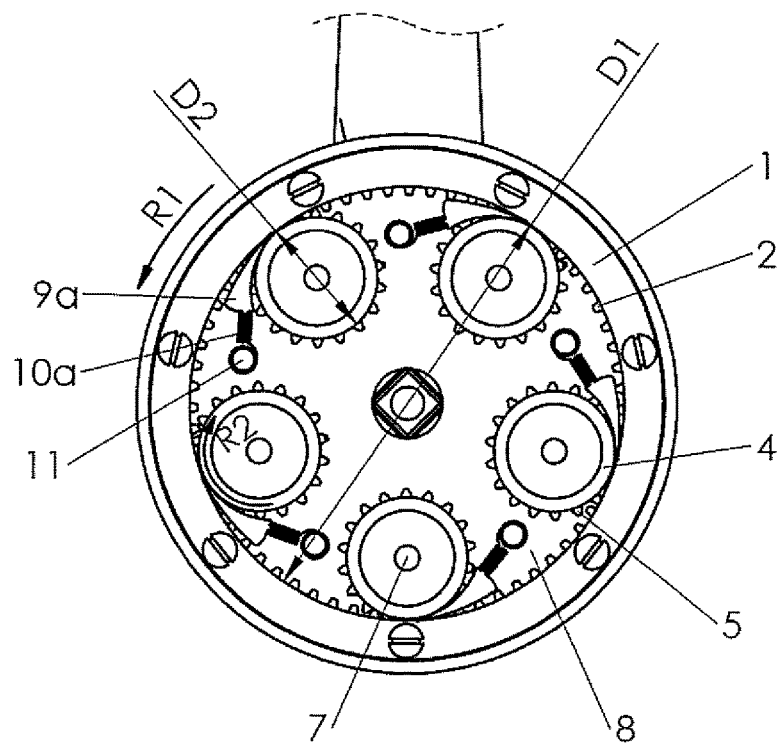
Figure 4:
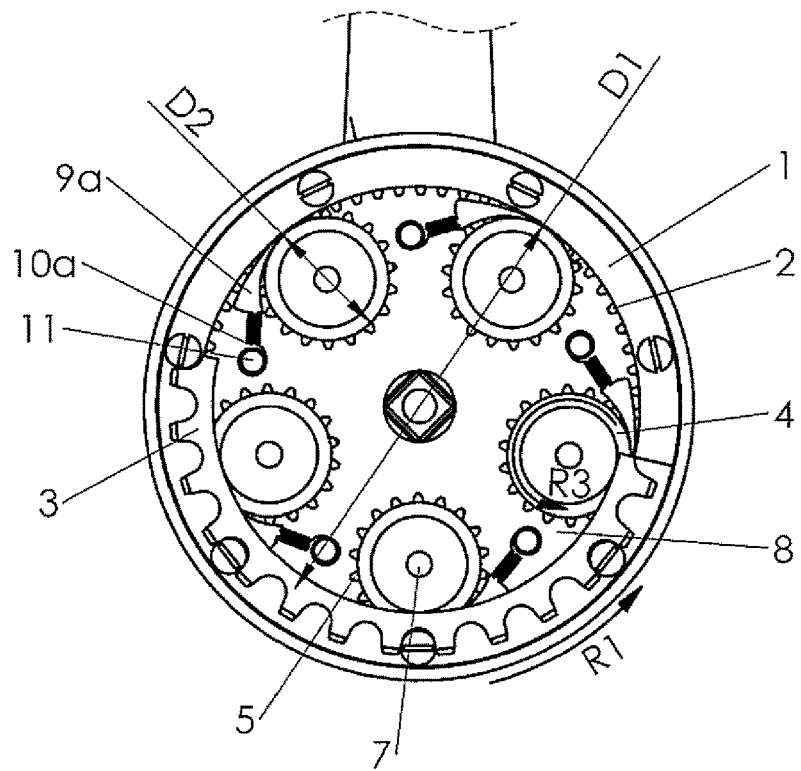
Figure 5:
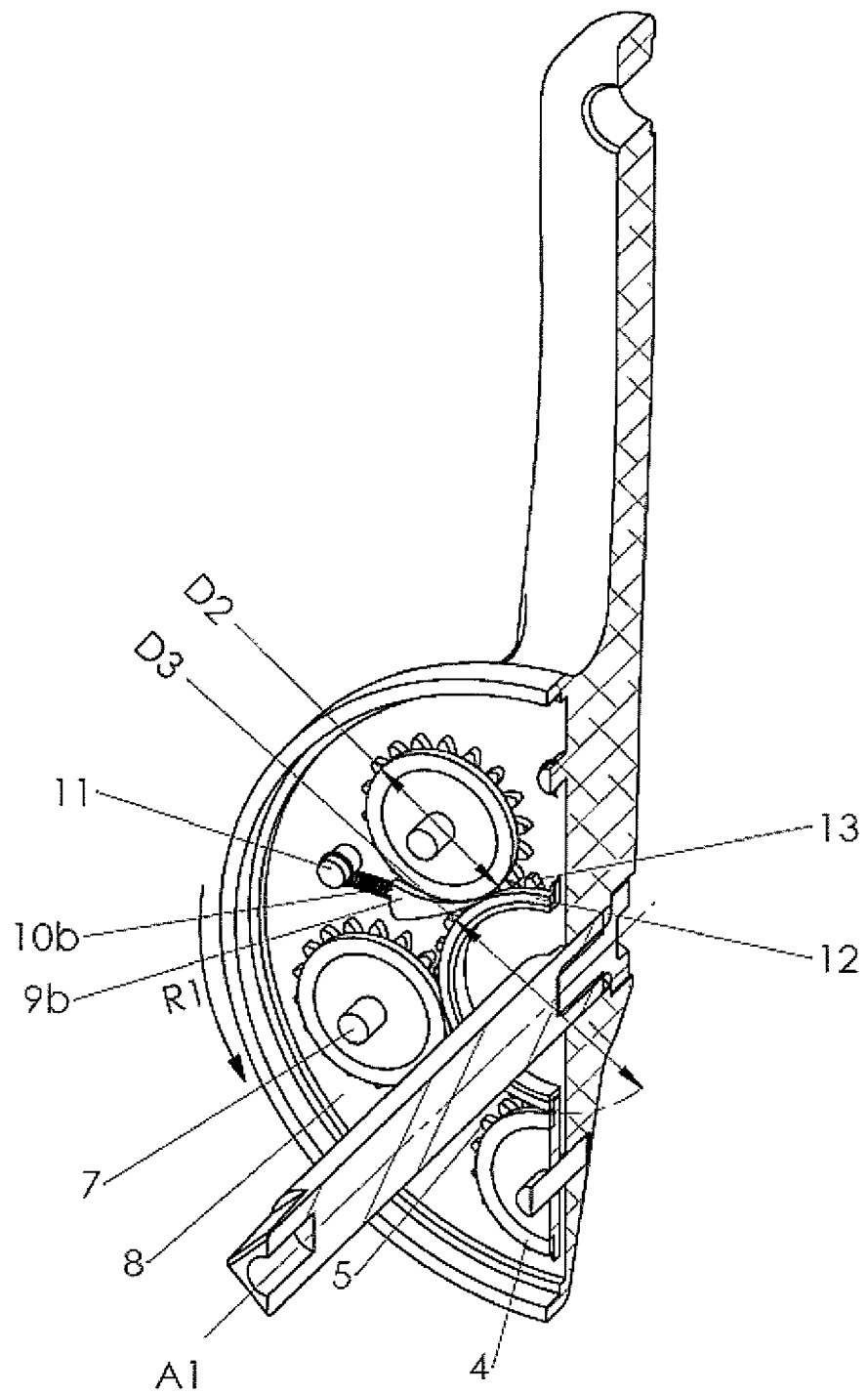

The invention was explained in detail in the embodiment, as shown in the drawing, in which FIG. 1 depicts an embodiment I of a mechanism according to the invention an isometric view of a vertical section, with parts of the chainring and the external raceway cut out, FIG. 2 depicts embodiment I of the mechanism according to invention a wedge with neighbouring elements, FIG. 3 depicts embodiment I of the mechanism according to invention the gripping mode diagram, FIG. 4 depicts embodiment I of the mechanism according to invention the rolling mode diagram, with part of the chainring cut out, FIG. 5 depicts an embodiment II of a mechanism according to the invention a trimetric view of a vertical section.

EMBODIMENT I

In embodiment I of the freewheel mechanism according to the invention, as shown in FIG. 1-4, the freewheel mechanism is equipped with external raceway 1 and external gear 2, that are rigidly connected with each other, in a way that their rotation in relation to each other is not possible. The external raceway 1 diameter D1 is close to the external gear 2 pitch circle diameter. The external raceway 1 is rigidly connected to the chainring 3. Also, freewheel mechanism includes rolls 4 and satellite gears 5. The roll 4 diameter D2 is close to the satellite gear 5 pitch circle diameter. The satellite gears 5 mate with the external gear 2. The rolls 4 and the satellite gears 5 are rigidly connected with each other. The satellite-gears 5 are rotationally mounted on satellite axles 7, which are mounted in a yoke 8. The yoke 8 is rotationally mounted in a way, so that it rotates around the freewheel central axis A1. The external gear 2 can rotate independently from the yoke 8. The freewheel mechanism contains also wedges 9a of type A, shown in FIG. 2, which are placed between the rolls 4 and the external raceway 1. The freewheel contains springs 10a of type A that are mounted on bolts 11, which are mounted in the yoke 8. Wedges 9a are being pressed by springs 10a in between the roll 4 and the satellite gear 5.

The process of freewheel mechanism operation in gripping mode according to embodiment I is shown in diagram depicted in FIG. 3. This diagram presents the freewheel transmitting the torque from the yoke 8 on to the external raceway 1. The input torque of the yoke 8 in direction R1 causes the satellite axles 7 to move. Satellite gears 5 mate with the external gear 2, so the rotation of satellite axles 7 makes the satellite gears 5 rotate in a direction R2. Rotation of satellite gears 5 makes the rolls 4 rotate in the same direction R2, which makes them press the wedges 9a of type A against the external raceway 1. If the friction between wedges 9a and external raceway 1 is high enough, the wedges 9a cause rotation of the external raceway 1. But if, under a resistance from the external raceway 1, the wedges 9a slip inside of it, the yoke 8 rotates further in the direction R1, what makes the satellite gears 5 rotate further in the direction R2, what makes rolls 4 press on the wedges 9a with an even bigger force, thus causing even more friction against the external raceway 1. The external raceway 1 is pushed by the wedges 9a and rotates in direction R1, so the torque is transmitted from the yoke 8 on to the external raceway 1, and further to the chainring 3. Gears function in the freewheel is to create bigger force between the rolls 4 and external raceway 1, if slippage between the wedges 9a and external raceway 1 takes place.

The process of freewheel mechanism operation in rolling mode according to embodiment I is shown in diagram depicted in FIG. 4. The input torque of the chainring 3 in direction R1 causes the external gear 2 to move. The external gear 2 mates with the satellite gears 5, which make the rolls 4 rotate in a direction R3. Rotation of satellite gears 5 makes the rolls 4 rotate in the same direction R3, which makes them push the wedges 9a out of the space between the roll 4 and the external raceway 1. The torque from the external gear 2 is not transmitted on to the yoke 8.

It is understood that modifications and variations of the arrangements and the details described herein will be apparent to others skilled in the art. For example, it is possible that wedges 9a in the freewheel can also be pushed in between the external raceway 1 and rolls 4 by other forces, than of a spring, including gravity or magnetic forces.

EMBODIMENT II

In embodiment II of the freewheel mechanism according to the invention, as shown in FIG. 5, the freewheel mechanism is equipped with sun raceway 12 and sun gear 13, that are rigidly connected with each other, in a way that their rotation in relation to each other is not possible. The sun raceway 12 diameter D3 is close to the sun gear 13 pitch circle diameter. Also, the freewheel mechanism includes rolls 4 and satellite gears 5. The roll 4 diameter D2 is close to the satellite gear 5 pitch circle diameter. The satellite gears 5 mate with the sun gear 13. The rolls 4 and the satellite gears 5 are rigidly connected with each other. The satellite gears 5 are rotationally mounted on satellite axles 7, which are mounted in a yoke 8. The yoke 8 is rotationally mounted in a way, so that it rotates around the freewheel central axis A1. The sun gear 13 can rotate independently from the yoke 8. The freewheel mechanism contains also wedges 9b of type B, which are placed between the rolls 4 and the sun raceway 12. The freewheel contains springs 10b of type B that are mounted on bolts 11, which are mounted in the yoke 8. Wedges 9b are being pressed by springs lib in between the roll 4 and the satellite gear 5.

In the process of freewheel mechanism operation in gripping mode, according to embodiment II, the freewheel transmits the torque in direction R1 from the yoke 8 on the satellite axles 7, and further on to the rolls 4, on to the wedges 9b, and on to the sun raceway 12.

Various modifications can be made without departing from the scope of the invention. The invention can be used in machines that require a one way transmission of torque. In particular, the invention can be used in bicycle planetary gearboxes and rear wheel hubs. The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A freewheel mechanism containing an external raceway, rolls, wedges, wherein the freewheel mechanism contains the external raceway and an external gear that are rigidly connected with each other,
    and it contains satellite gears and rolls that are rigidly connected with each other, wherein the satellite gears mate with the external gear,
    wherein the satellite gears are mounted on satellite axles, wherein the satellite axles are mounted in a yoke,
    wherein the freewheel mechanism contains wedges, which are placed between the rolls and the external raceway.

2. The freewheel mechanism according to claim 1 wherein the rolls have a diameter close to the satellite gears pitch circle diameter.

3. The freewheel mechanism according to claim 1 wherein the freewheel mechanism contains the external raceway with a diameter close to the external gear pitch circle diameter.

4. The freewheel mechanism according to claim 1 wherein the satellite gears are rotationally mounted on the satellite axles.

5. The freewheel mechanism according to claim 1 wherein the satellite axles are rotationally mounted in the yoke.

6. The freewheel mechanism according to claim 1 wherein the wedges are pressed by springs into the space between the rolls and the external raceway.

7. The freewheel mechanism according to claim 1 wherein the freewheel mechanism contains springs, which are mounted on bolts.

8. The freewheel mechanism according to claim 1 wherein it contains external raceway which is rigidly connected to a chainring.

9. The freewheel mechanism containing a sun raceway, rolls, wedges, wherein the freewheel mechanism contains the sun raceway and a sun gear that are rigidly connected with each other,
    and it contains satellite gears and rolls that are rigidly connected with each other, wherein the satellite gears mate with the sun gear,
    wherein the satellite gears are mounted on satellite axles, wherein the satellite axles are mounted in a yoke,
    wherein the freewheel mechanism contains wedges, which are placed between the rolls and the sun raceway.

10. The freewheel mechanism according to claim 9 wherein the rolls have a diameter close to the satellite gears pitch circle diameter.

11. The freewheel mechanism according to claim 9 wherein the freewheel mechanism contains the sun raceway with a diameter close to the sun gear pitch circle diameter.

12. The freewheel mechanism according to claim 9 wherein the satellite gears are rotationally mounted on the satellite axles.

13. The freewheel mechanism according to claim 9 wherein the satellite axles that are rotationally mounted in the yoke.

14. The freewheel mechanism according to claim 9 wherein the wedges are pressed by springs into the space between the rolls and the sun raceway.

15. The freewheel mechanism according to claim 9 wherein the springs are mounted on bolts.

* * * * *